(12) United States Patent
Mori et al.

(10) Patent No.: US 9,586,340 B2
(45) Date of Patent: Mar. 7, 2017

(54) ROTOR FOR KNEADING, KNEADING MACHINE, AND METHOD FOR MANUFACTURING ROTOR FOR KNEADING

(71) Applicant: MITSUBISHI HEAVY INDUSTRIES MACHINERY TECHNOLOGY CORPORATION, Hiroshima-shi, Hiroshima (JP)

(72) Inventors: Ryutaro Mori, Tokyo (JP); Kazunari Tanaka, Tokyo (JP); Takashi Moribe, Tokyo (JP)

(73) Assignee: MITSUBISHI HEAVY INDUSTRIES MACHINERY TECHNOLOGY CORPORATION, Hiroshima-Shi, Hiroshima (JP)

( * ) Notice: Subject to any disclaimer, the term of this patent is extended or adjusted under 35 U.S.C. 154(b) by 120 days.

(21) Appl. No.: 14/343,634

(22) PCT Filed: Jan. 22, 2013

(86) PCT No.: PCT/JP2013/051145
§ 371 (c)(1),
(2) Date: Mar. 7, 2014

(87) PCT Pub. No.: WO2013/111724
PCT Pub. Date: Aug. 1, 2013

(65) Prior Publication Data
US 2014/0233342 A1    Aug. 21, 2014

(30) Foreign Application Priority Data
Jan. 25, 2012   (JP) ................................ 2012-013222

(51) Int. Cl.
B22D 25/02    (2006.01)
B29B 7/82    (2006.01)
(Continued)

(52) U.S. Cl.
CPC .............. *B29B 7/826* (2013.01); *B22D 19/04* (2013.01); *B22D 25/02* (2013.01); *B29B 7/186* (2013.01); *B29B 7/82* (2013.01); *B29C 39/10* (2013.01)

(58) Field of Classification Search
CPC ....... B29B 7/82; B29B 7/186; B29C 47/0844; B29C 47/0845; B29C 47/605; B29C 39/10;
(Continued)

(56) References Cited

U.S. PATENT DOCUMENTS 3,314,650 A * 4/1967 McCormick ............ F01D 5/181
 415/114
3,806,276 A    4/1974 Aspinwall
(Continued)

FOREIGN PATENT DOCUMENTS

CN    100369660 C    2/2008
CN    201079735 Y    7/2008
(Continued)

OTHER PUBLICATIONS

PCT, "International Search Report for PCT/JP2013/051145," Apr. 16, 2013.
(Continued)

*Primary Examiner* — Tony G Soohoo
*Assistant Examiner* — Elizabeth Insler
(74) *Attorney, Agent, or Firm* — Manabu Kanesaka (57) ABSTRACT

This rotor for kneading includes a rotor shaft (27) having a tubular shape; a blade part (22) that is provided on an outer peripheral surface of the rotor shaft (27); and a filling body (36) that is provided in a recessed part (28) formed inside the blade part (22) and made from a material having a higher thermal conductivity than a material from which the rotor shaft (27) and the blade part (22) are made.

2 Claims, 6 Drawing Sheets (51) Int. Cl.
  *B29C 39/10* (2006.01)
  *B29B 7/18* (2006.01)
  *B22D 19/04* (2006.01)

(58) Field of Classification Search
  CPC ........ B29C 70/88; B22D 19/04; B22D 25/02; F01D 5/181
  See application file for complete search history.

(56) References Cited

U.S. PATENT DOCUMENTS

| | | | |
|---|---|---|---|
| 7,677,789 B2 * | 3/2010 | Huffstetler | B29B 7/186 366/147 |
| 2010/0271901 A1 | 10/2010 | Yamaguchi et al. | |
| 2011/0222364 A1 | 9/2011 | Yoshida et al. | |

FOREIGN PATENT DOCUMENTS

| | | |
|---|---|---|
| CN | 102136787 A | 7/2011 |
| EP | 1312452 A1 | 5/2003 |
| JP | S52-005395 B2 | 2/1977 |
| JP | H02-269011 A | 11/1990 |
| JP | 2003-117376 A | 4/2003 |
| JP | 2005-059528 A | 3/2005 |
| JP | 2006-026991 A | 2/2006 |
| JP | 2008-062532 A | 3/2008 |
| JP | 2009-189907 A | 8/2009 |
| JP | 2011-016087 A | 1/2011 |
| JP | 2013-154598 A | 8/2013 |
| JP | 2013-159012 A | 8/2013 |
| KR | 10-2003-0073903 A | 9/2003 |
| TW | 586962 B | 5/2004 |

OTHER PUBLICATIONS

PCT, "Written Opinion for PCT/JP2013/051145," Apr. 16, 2013.
HF Mixing Group, "High performance E-and VIC-series internal mixers," Intermix, p. 1-12.
Japan Patent Office, "Office Action for JP 2012-013222," Nov. 4, 2014.
Taiwan Patent Office, "Office Action for TW 102102359," Jan. 19, 2015.
Japan Patent Office, "Office Action for JP 2012-013222," Feb. 17, 2015.
China Patent Office, "Office Action for CN 201380003244.9," Feb. 28, 2015.
Korea Patent Office, "Office Action for KR 10-2014-7007681," Aug. 31, 2015.

* cited by examiner

ROTOR FOR KNEADING, KNEADING MACHINE, AND METHOD FOR MANUFACTURING ROTOR FOR KNEADING

TECHNICAL FIELD

The present invention relates to a rotor for kneading that kneads a rubber material or the like, a kneading machine, and a method for manufacturing the rotor for kneading, and particularly, to its cooling structure. Priority is claimed on Japanese Patent Application No. 2012-013222, filed Jan. 25, 2012, the content of which is incorporated herein by reference.

BACKGROUND ART

In the related art, in kneading machines for rubber manufacturing, such as a so-called internal mixer, heat is generated with kneading because the kneading is performed by applying a strong shear force to a material, such as rubber. When the temperature of rubber becomes excessive due to such heat generation, sufficient cooling capacity is required because the quality of rubber degrades. Also, when the cooling capacity is insufficient, it is necessary to perform the kneading again after rubber is discharged to the outside in the middle of the kneading and is cooled to decrease in temperature thereof. Therefore, productivity is greatly affected.

Here, an example of a kneading machine including a rotor for kneading with a so-called one-piece structure in which a rotor shaft and a blade part are integrally formed is described in PTL 1.

The kneading machine of PTL 1 accommodates a rotor for kneading having the rotor shaft provided with a cooling passage and the blade part for kneading, inside a mixing chamber thereof.

Additionally, in this kneading machine, a branch pipe is provided in an inner pipe accommodated in the cooling passage formed in the rotor shaft so that the cooling passage and a cavity portion (jacket) inside the blade part communicate with each other, and the cooling effect of the blade part is improved such that a cooling medium fed to the cooling passage is reliably introduced into the cavity portion inside the blade part.

CITATION LIST

Patent Literature

[PTL 1] Japanese Examined Patent Application No. S52-5395

SUMMARY OF INVENTION

Problem to be Solved by the Invention

In the rotor for kneading in the kneading machine of PTL 1, the cooling effect of the blade part is improved such that the cooling medium fed to the cooling passage is reliably introduced into the cavity portion inside the blade part. However, in the cavity portion of the blade part, the cross-sectional area of a flow passage of the cooling medium becomes large. For this reason, lowering of the flow velocity cannot be avoided, and there is a possibility that the heat transfer efficiency may decrease and a sufficient cooling effect may not be obtained.

Also, there is generally known a rotor for kneading with a two-piece structure in which a rotor shaft and a blade part are manufactured as separate parts, and the rotor shaft and the blade part are combined together by fitting after a flow channel for a cooling medium is formed in an inner surface of the blade part that comes into contact with the rotor shaft. The cooling capacity can be improved by adopting such a rotor for kneading. However, many man-hours related to a fitting step are required. Therefore, a kneading machine including such a rotor for kneading is disadvantageous in terms of cost.

An object of the invention is to provide a rotor for kneading, a kneading machine, and a method for manufacturing the rotor for kneading that can improve cooling efficiency while suppressing costs.

Means for Solving the Problem

According to a first aspect of the invention, a rotor for kneading includes a rotor shaft having a tubular shape; a blade part that is provided on an outer peripheral surface of the rotor shaft; and a filling body that is provided in a recessed part formed inside the blade part and made from a material having a higher thermal conductivity than a material from which the rotor shaft and the blade part are made.

According to the above configuration, the thermal resistance of the blade part can be reduced compared to a case where the inside of the blade part has a solid structure using the same material as the blade part, and the cooling effect when the inner surface of the rotor shaft is cooled by forced convection heat transfer caused by a refrigerant can be improved. Moreover, compared with a case where the filling body is not installed inside the recessed part and the inner surface of the recessed part as a hollow structure is cooled by the forced convection heat transfer caused by the refrigerant, a decrease in heat transfer efficiency accompanying flow velocity reduction caused by an increase in the flow channel cross-sectional area of the refrigerant occurring when the refrigerant flows to the recessed part can be prevented. Additionally, simply by installing the filling body, the cooling effect is improved, and a significant cost increase does not occur.

Additionally, the rotor for kneading may further include fins that are formed on an inner peripheral surface of the filling body and protrude to an inner peripheral side of the filling body.

When cooling is performed by the forced convection heat transfer by the refrigerant by virtue of the fins of the filling body that thermally contacts the recessed part of such a blade part, the heat transfer area is expanded and the amount of heat transfer increases. Thus, it is possible to enhance the cooling effect.

Additionally, by providing only the filling body with the fins, the pressure loss when the refrigerant is made to flow is not significantly increased.

Moreover, according to a second aspect of the invention, a kneading machine includes the rotor for kneading.

According to the above configuration, by applying the rotor for kneading in which the filling body made of the high thermal conductivity member having a higher thermal conductivity than the material from which the rotor shaft is made is installed inside the recessed part provided in the blade part of the rotor shaft, the cooling efficiency can be improvised while suppressing costs.

Additionally, according to a third aspect of the invention, the method for manufacturing a rotor for kneading is a method having a rotor shaft that is tubular and has a blade part for kneading provided on an outer peripheral surface thereof. The method includes a filling body forming step of forming a member made from a material, which has a higher thermal conductivity than the material of the rotor shaft and the blade part, in a predetermined shape; a filling body arranging step of arranging the filling body formed in the filling body forming step, inside a mold of the rotor shaft, at a position located further toward a radial inner side of the rotor shaft than an outer peripheral surface of the blade part, at a position where the blade part of the rotor shaft is provided; and an insert casting step of pouring the material of the rotor shaft into the mold in a state where the filling body is arranged in the filling body arranging step.

According to the method for manufacturing the rotor for kneading, it is possible to manufacture the rotor for kneading by using the method for casting the filling body to a radial inner side of the blade part of the rotor shaft in a state where the filling body is formed in advance, that is, insert-casting. Accordingly, it is possible to manufacture the rotor for kneading in which it is not necessary to carry out complicated manufacturing steps, and the cooling efficiency is improved while suppressing costs.

According to a fourth aspect of the invention, the method for manufacturing a rotor for kneading is a method having a rotor shaft that is tubular and has a blade part for kneading provided on an outer peripheral surface thereof. The method includes a rotor shaft manufacturing step of manufacturing the rotor shaft such that a recessed part is formed inside the rotor shaft at a position where the blade part is provided; and a filling step of filling a filling material made from a material having a higher thermal conductivity than the material of the rotor shaft and the blade part, into the recessed part from an outer side of the rotor shaft, to install the filling body.

According to the method for manufacturing the rotor for kneading, by pouring the filling material into the recessed part from the outside of the rotor shaft, the filling material can be reliably filled into the recessed part due to its own weight to install the filling body. Accordingly, it is possible to manufacture the rotor for kneading in which it is not necessary to carry out complicated manufacturing steps, and the cooling efficiency can be improved while suppressing costs.

Advantageous Effects of Invention

According to the rotor for kneading, the kneading machine, and the method for manufacturing the rotor for kneading, it is possible to improve the cooling efficiency while suppressing costs by installing the filling body in the recessed part of the blade part.

DESCRIPTION OF EMBODIMENTS

Hereinafter, a rotor for kneading, a kneading machine, and a method for manufacturing the rotor for kneading in a plurality of embodiments related to the invention will be described with reference to the drawings.

(First Embodiment)

Figure 1:
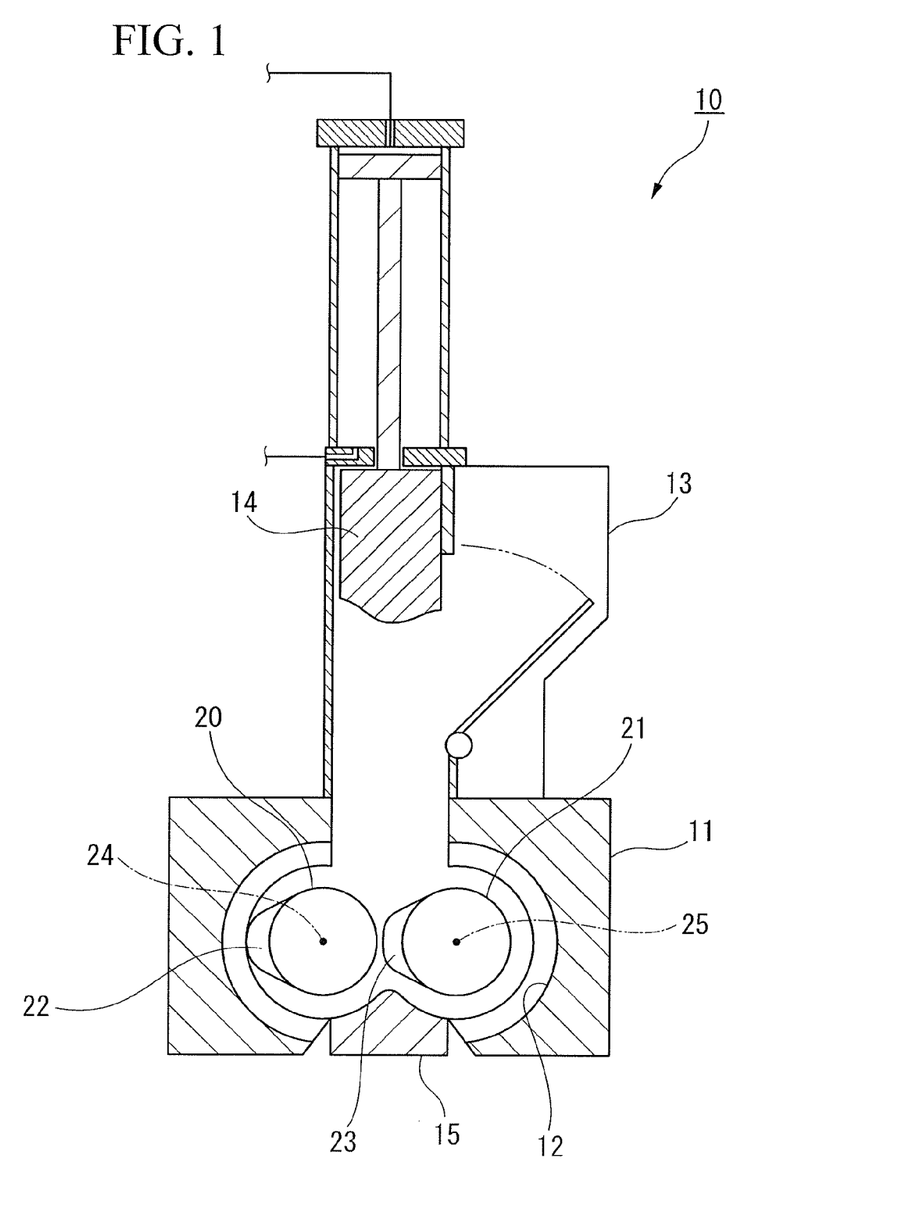
FIG. 1 is a longitudinal cross-sectional view of a kneading machine including a rotor for kneading of a first embodiment related to the invention.

As shown in FIG. 1, a kneading machine 10 including rotors 20 and 21 for kneading of a first embodiment related to the invention forms a kneading chamber 12 inside a casing 11.

The kneading machine 10 is a so-called enclosed kneading machine in which the pair of rotors 20 and 21 for kneading is arranged in parallel inside the kneading chamber 12.

The pair of rotors 20 and 21 for kneading rotates in mutually opposite directions by a drive source, such as a motor (not shown), and forms blade parts 22 and 23, which overhang toward the outside, respectively, on their respective outer surfaces.

The blade parts 22 and 23 are formed so as to be spirally twisted with respect to axes 24 and 25 of the rotors 20 and 21 for kneading. The blade parts 22 and 23 are arranged so as to mesh with each other by the rotation of the rotors 20 and 21 for kneading.

Moreover, an upper portion of the kneading machine 10 is provided with a hopper 13 that communicates with the kneading chamber 12 and allows a kneading material, such as a rubber raw material, to be fed thereinto, and a floating weight 14 that presses the kneading material fed into the hopper 13 into the kneading chamber 12.

Additionally, a drop door 15 for taking out the kneaded material to the outside is openably and closably attached to the bottom of the kneading machine 10.

The kneading machine 10 presses the kneading material fed via the hopper 13 into the kneading chamber 12 by the floating weight 14.

Next, the kneading material is kneaded by a meshing action between the rotors 20 and 21 for kneading that rotate in mutually opposite directions and a shearing action generated between the rotors 20 and 21 for kneading and an inner surface of the kneading chamber 12.

Then, the kneading machine 10 opens the drop door 15 provided at the bottom of the kneading chamber 12, thereby taking out the kneaded material from the kneading chamber 12 to the outside and carrying the kneaded material to other steps.

Next, the detailed structure of the rotors 20 and 21 for kneading will be described.

In addition, since the pair of rotors 20 and 21 for kneading has the same structure, only one rotor 20 for kneading will be described herein, and the description of the other rotor 21 for kneading will be omitted.

Figure 2:
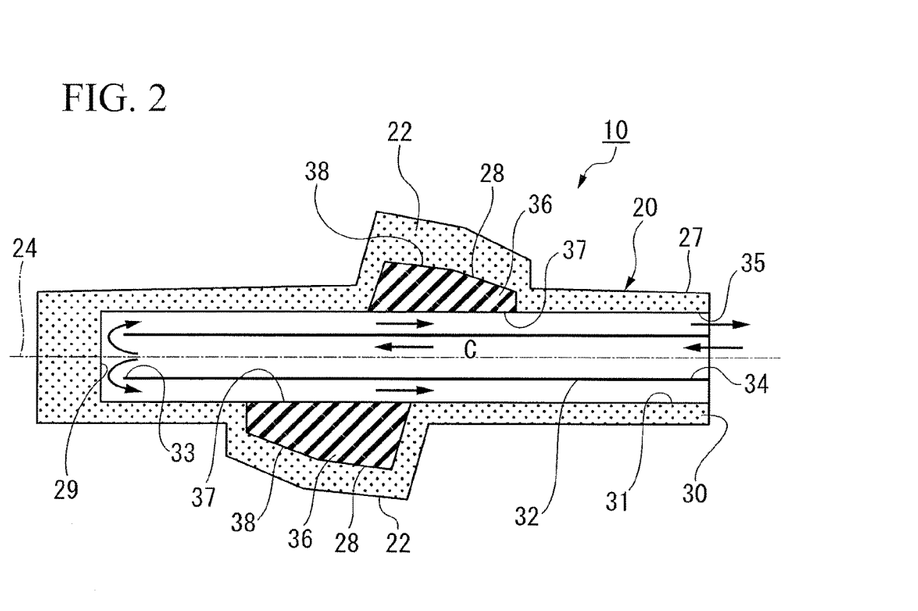
FIG. 2 is a longitudinal cross-sectional view of the rotor for kneading of the first embodiment related to the invention.

As shown in FIG. 2, the rotor 20 for kneading has a tubular rotor shaft 27 that has a cavity formed therein, and the spiral blade part 22 that overhangs toward an external surface of the rotor shaft 27.

A recessed part 28 spirally formed along an axis 24 is formed on a back side of the blade part 22 in an inner surface of the rotor shaft 27.

Here, the rotor 20 for kneading is formed by a so-called metallic one-piece structure in which the blade part 22 having the recessed part 28 and the rotor shaft 27 are integrally formed by casting or the like.

Additionally, the rotor 20 for kneading has a blocking part 29 that is provided at one end portion in the direction of the axis 24 and blocks the one end portion, and a pipe accommodating part 31 that is provided at the other end portion in the direction of the axis 24 and has an opening portion 30 that communicates with a cavity inside the rotor shaft.

Moreover, the rotor 20 for kneading accommodates an insertion member 32 in the pipe accommodating part 31.

The insertion member 32 is accommodated inside the pipe accommodating part 31 so that a tip opening portion 33 is arranged at a position apart from the blocking part 29 with a gap.

For this reason, a cooling medium C, which is introduced from a cooling medium inlet 34 provided at a base end portion of the insertion member 32, flows from the tip opening portion 33 through a clearance between the tip opening portion 33 and the blocking part 29 to a cooling medium outlet 35 while coming into contact with an inner surface of the pipe accommodating part 31.

The rotor 20 for kneading includes a filling body 36 that is filled into the recessed part 28 provided in the blade part 22 of the rotor shaft 27 and is formed from a material having a higher thermal conductivity than a material (for example, cast iron or the like) that forms the rotor shaft 27.

The filling body 36 is made of, for example, a high thermal conductivity member, such as carbon steel having a thermal conductivity of about 50 W/m·K, silicon carbide having a thermal conductivity of 170 W/m·K, beryllium oxide having a thermal conductivity of 272 W/m·K, and aluminum having a thermal conductivity of 237 W/m·K.

In addition, it goes without saying that preferable materials in addition to these materials can be appropriately applied as the filling body 36.

The filling body 36 has a cooling medium contact surface 37, which comes into contact with the cooling medium C, on its inner peripheral surface, and has a blade part contact surface 38, which comes into contact with the recessed part 28 of the blade part 22, on its outer peripheral surface.

Next, the operation of the rotor 20 for kneading will be described.

The kneading material is kneaded by the meshing action of the rotors 20 (21) for kneading that rotate in mutually opposite directions and the shearing action generated between the rotors 20 (21) for kneading and the inner surface of the kneading chamber 12.

At this time, the insertion member 32 rotates together with the rotor 20 for kneading, and the cooling medium C introduced from the cooling medium inlet 34 flows from the tip opening portion 33 to the cooling medium outlet 35 while coming into contact with the inner surface of the pipe accommodating part 31.

Then, the cooling medium C comes into contact with the cooling medium contact surface 37 of the filling body 36 while coming into contact with the inner surface of the pipe accommodating part 31 of the rotor 20 for kneading.

In this way, the cooling medium C will perform cooling caused by forced convection heat transfer, on the inner surface of the pipe accommodating part 31 of the rotor 20 for kneading and on the filling body 36 holding the heat that propagates from the recessed part 28 of the blade part 22.

As described above, according to the rotor 20 for kneading of the first embodiment, the filling body 36 made of the high thermal conductivity member having a higher thermal conductivity than a material from which the rotor shaft 27 is made is installed inside the recessed part 28 provided in the blade part 22 of the rotor shaft 27. Therefore, according to the rotor 20 for kneading, the thermal resistance of the blade part 22 can be reduced compared to a case where the recessed part 28 is not provided, that is, a case where the blade part 22 has a solid structure by a member made from the same material as the blade part 22. Also, the cooling effect can be improved by cooling the cooling medium contact surface 37 of the filling body 36 with forced convection by the cooling medium C.

Moreover, compared with a case where the filling body 36 is not installed inside the recessed part 28 and the recessed part 28 as a hollow structure is cooled by the forced convection heat transfer caused by the cooling medium C, the flow velocity reduction of the cooling medium C generated as the cross-sectional area of a flow channel becomes large when the cooling medium C flows to the recessed part 28 can be prevented. The cooling effect can be improved due to this respect too.

According to the kneading machine 10 of the first embodiment, the rotor 20 for kneading in which the filling body 36 made of the high thermal conductivity member having a higher thermal conductivity than a material from which the rotor shaft 27 is made is installed inside the recessed part 28 provided in the blade part 22 of the rotor shaft 27. Accordingly, the cooling efficiency can be improved while suppressing costs.

(Second Embodiment)

Next, a rotor 50 for kneading and a kneading machine 40 of a second embodiment related to the invention will be described.

In addition, in the following respective embodiment, description of constituent elements that duplicate those of the aforementioned first embodiment or constituent elements that are functionally similar thereto is simplified or omitted by having the same reference numerals or equivalent reference numerals in the drawings.

Figure 3:
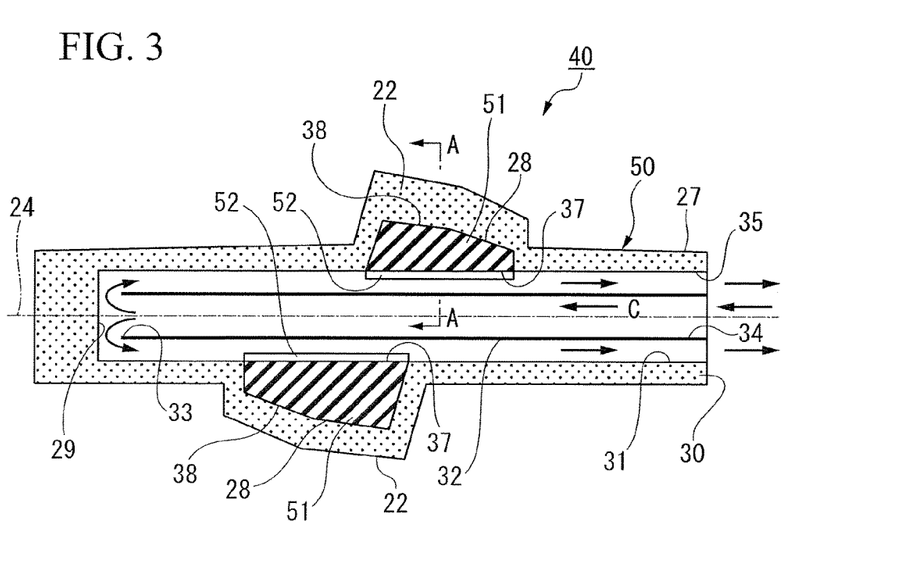
FIG. 3 is a longitudinal cross-sectional view of main portions of a rotor for kneading of a second embodiment related to the invention.

As shown in FIG. 3, the rotor 50 for kneading equipped in the kneading machine 40 of the second embodiment related to the invention has a plurality of fins 52 that protrude toward the axial center of the rotor 50 on an inner peripheral surface of the filling body 51. The plurality of fins 52 are formed integrally with the filling body 51.

Figure 4:
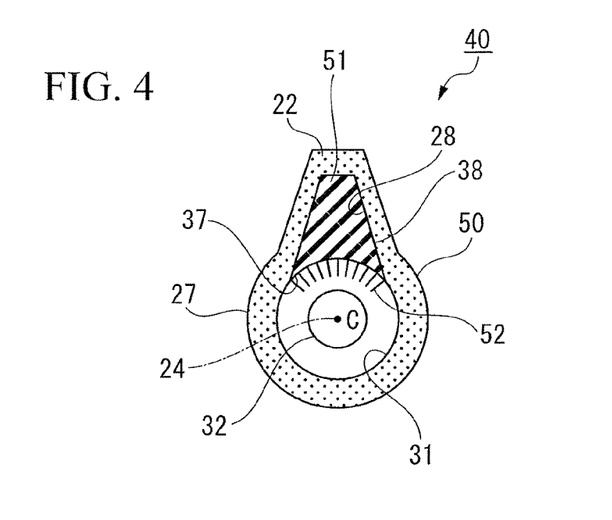
FIG. 4 is a cross-sectional view of the rotor for kneading along the line A-A shown in FIG. 3.

As shown in FIG. 4, the plurality of fins 52 have a plate shape, and extend parallel to each other in the direction of the axis 24. This has a function to increase the surface area of the filling body 51.

As the plurality of fins 52 are also provided on the filling body 51, the surface area (heat transfer area) of the filling body 51 that comes into contact with the cooling medium C expands and the amount of heat transfer between the filling body 51 and the cooling medium C increases. Thus, the cooling efficiency by the cooling medium C is consequently enhanced.

In addition, the shape of the plurality of fins 52 includes plate-shaped fins, needlelike fins, or the like that have an angle with respect to the direction of the axis 24, in addition to the plate-shaped fins parallel to the direction of the axis 24 as shown.

Next, the operation of the rotor 50 for kneading will be described.

The rotor 50 for kneading kneads a kneading material by a shearing action generated between the rotor and the inner surface of the kneading chamber 12 with its rotation, and introduces the cooling medium C from the cooling medium inlet 34 of the insertion member 32.

The cooling medium C flows from the tip opening portion 33 to the cooling medium outlet 35 while thermally connecting with the inner surface of the pipe accommodating part 31.

Also, the cooling medium C comes into contact with the plurality of fins 52 of the filling body 51 thermally connected to the recessed part 28 of the blade part 22 while coming into contact with the inner surface of the pipe accommodating part 31 of the rotor 50 for kneading.

At this time, as the rubber material generates heat at the blade part 22 by shearing and the thermal resistance (caused by thickness) of heat conduction is high, the temperature of the portion of the blade part 22 becomes higher than that of the rotor shaft 27 with no blade part 22 when viewed in an axial longitudinal direction.

Thus, since the heat transfer area of the cooling medium C is expanded and the amount of heat transfer thereof is increased by virtue of the plurality of fins 52 of the filling body 51 that thermally contacts the recessed part 28 of the blade part 22, consequently it is possible to enhance the cooling effect, and the amount of cooling can be increased.

According to the rotor 50 for kneading of the second embodiment, the cooling effect can be improved by the plurality of fins 52 of the filling body 51 that thermally contacts the recessed part 28 of the blade part 22. Therefore, according to the rotor 50 for kneading, cooling can be efficiently performed.

Although the first to second embodiments of the invention have been described above with reference to the drawings, the specific configuration is not limited to the embodiments. For example, blade parts 22 may be formed so as to overhang to the external surface of the rotor shaft 27 at regular intervals in the direction of the axis 24 of the rotor shaft 27.

Figure 5:
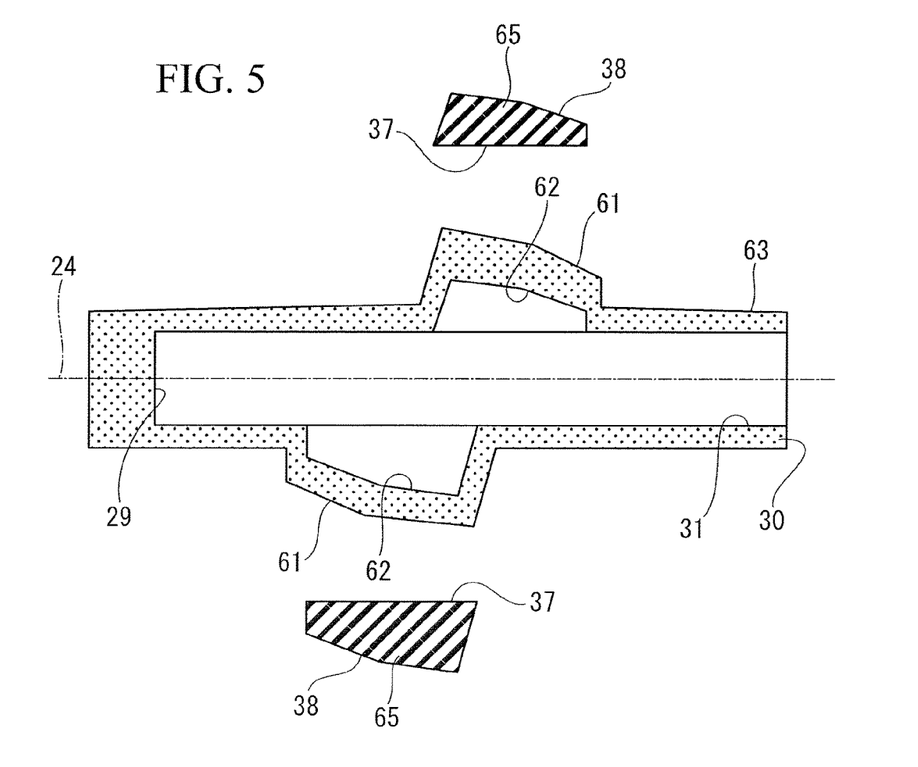
FIG. 5 is a longitudinal cross-sectional view of a first step in a first example of a method for manufacturing the rotor for kneading related to the invention.

Next, a first example of the method for manufacturing the rotor for kneading related to the invention will be described.

In addition, a rotor 60 for kneading has substantially the same configuration as the rotors 20 and 21 for kneading of the first embodiment and is cast using a mold.

As shown in FIG. 5, in a first step (filling body forming step) in the first example of the method for manufacturing the rotor 60 for kneading, a filling body 65 formed from a material having a higher thermal conductivity than a material that forms a rotor shaft 63 is formed in the same shape as a recessed part 62. Additionally, this filling material needs to have a higher melting point than the material from which the rotor shaft 63 is made, for example, silicon carbide, beryllium oxide, or the like can be used.

Next, in a second step (filling body arranging step), the filling body 65 is arranged at the position of the above mold corresponding to the recessed part 62 of the rotor shaft 63 so as to be accommodated in the recessed part 62, which is formed at a position located further toward a radial inner side of the rotor shaft 63 than an outer peripheral surface of the blade part 61, at a position where the blade part 61 is provided on an outer peripheral surface of the rotor shaft 63, that is, which is formed in an inner peripheral surface of the blade part 61.

Figure 6:
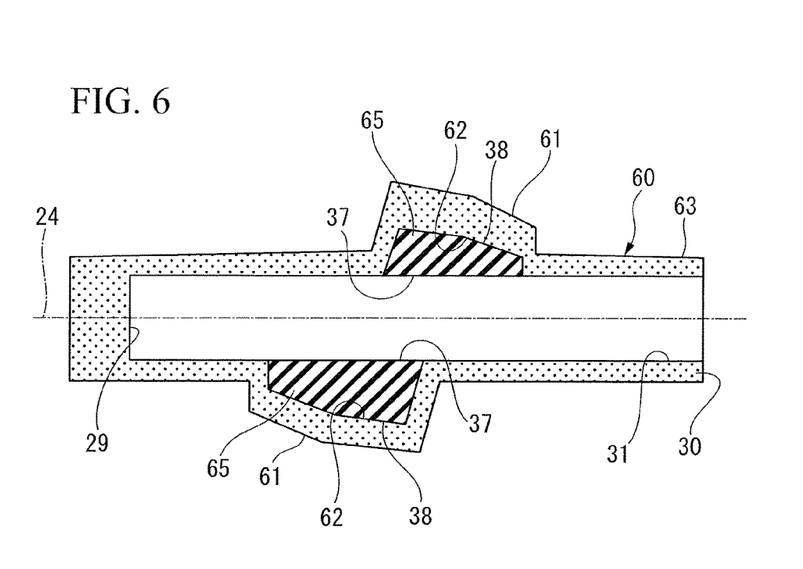
FIG. 6 is a longitudinal cross-sectional view of a third step in the first example of the method for manufacturing the rotor for kneading shown in FIG. 5.

Then, as shown in FIG. 6, the filling body 65, which is formed in advance in the first step and is arranged in the above mold in the second step, is cast into the recessed part 62 in a third step (insert casting step). That is, the material of the rotor shaft 63 is poured into the above mold, and the filling body 65 is insert-cast into the recessed part 62.

In this way, it is possible to obtain the rotor 60 for kneading in which the filling body 65 made of the high thermal conductivity member having a higher thermal conductivity than the material from which the rotor shaft 63 is made is installed inside the recessed part 62 provided in the blade part 61 of the rotor shaft 63.

According to the first example of the method for manufacturing the rotor 60 for kneading, it is possible to manufacture the rotor for kneading by using the method for casting the filling body 65 into the recessed part 62 of the blade part 61 of the rotor shaft 63 in a state where the filling body 65 is formed in advance, that is, the insert-casting. Accordingly, it is not necessary to carry out complicated manufacturing steps, and it is also possible to use the existing mold. As a result, the rotor for kneading can be manufactured while suppressing costs.

Next, a second example of the method for manufacturing the rotor for kneading related to the invention will be described.

Figure 7:
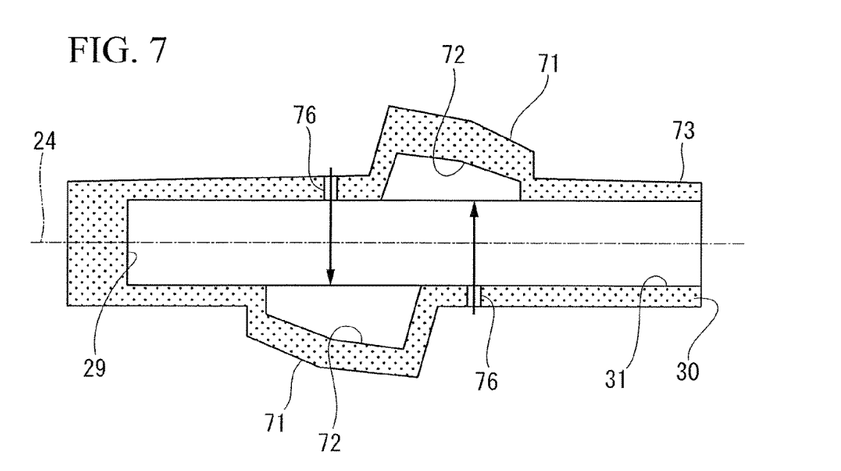
FIG. 7 is a longitudinal cross-sectional view of a first step in a second example of the method for manufacturing the rotor for kneading related to the invention.

In addition, a rotor 70 for kneading has substantially the same configuration as the rotors 20 and 21 for kneading of the first embodiment.

As shown in FIG. 7, in a first step (rotor shaft manufacturing step) in the second example of the method for manufacturing the rotor 70 for kneading, the rotor shaft 73 that is a tubular member is manufactured by casting or the like. The rotor shaft 73 is provided with a blade part 71 that overhangs toward an external surface of the rotor shaft 73. A recessed part 72 is formed on a back side of the blade part 71 in an inner surface of the rotor shaft 73.

At this time, filling holes 76, which allow the outside and the recessed part 72 to communicate with each other and enable a filling body 75 to be filled therethrough, are simultaneously formed at positions that faces the blade part 71, that is, on sides opposite to the blade part 71 in a radial direction of the rotor shaft 73.

Figure 8:
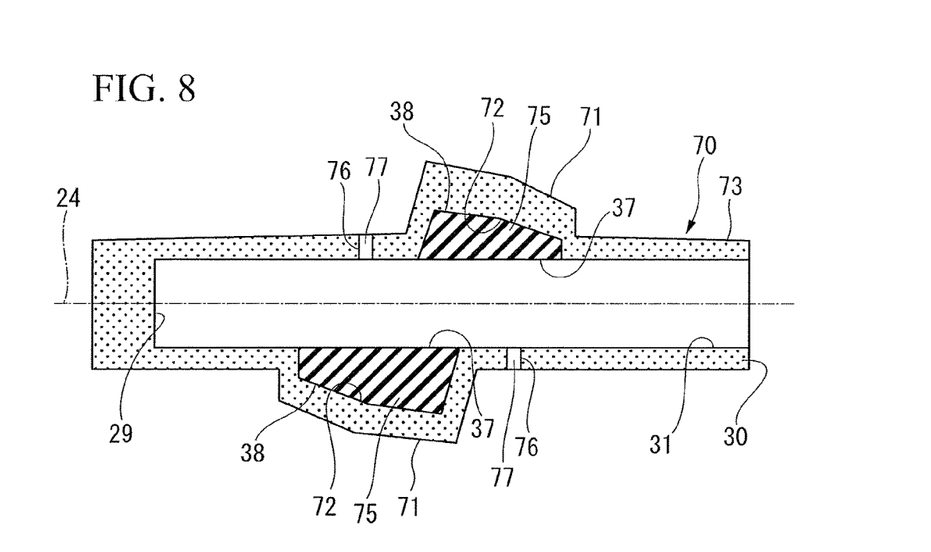
FIG. 8 is a longitudinal cross-sectional view of a second step in the second example of the method for manufacturing the rotor for kneading shown in FIG. 7.

Next, as shown in FIG. 8, in a second step (filling step), a filling material made from a material having a higher thermal conductivity than a material from which the blade part 71 and the rotor shaft 73 are made is poured into the recessed part 72 from the filling holes 76. Additionally, this filling material needs to have a lower melting point than a material from which the rotor shaft 73 is made, for example, aluminum or the like can be used.

At this time, after one filling hole 76 is arranged upward and the filling material is poured into the recessed part 72 on one side, which is arranged downward, from one filling hole 76, one filling hole 76 is welded by one plug material 77 and one filling hole 76 is blocked.

Next, after the other filling hole 76 is arranged upward and the filling material is poured into the recessed part 72 on the other side, which is arranged downward, from the other filling hole 76, the other filling hole 76 is welded by the other plug material 77 and the other filling hole 76 is blocked.

By virtue of this second step, it is possible to obtain the rotor 70 for kneading in which the filling body 75 made of the high thermal conductivity member having a higher thermal conductivity than the material from which the blade part 71 and the rotor shaft 73 are made is installed in the recessed part 72 of the blade part 71.

According to the second example of the method for manufacturing the rotor 70 for kneading, a cavity-like recessed part 72 is formed in advance at a predetermined position, and the filling holes 76 are formed at positions that face the blade part 71. Then, the filling body 75 is installed in the recessed part 72 by pouring the filling material from the filling holes 76.

When the filling material is poured, by pouring the filling material into the downward recessed part 72 from the filling hole 76 arranged upward, the filling material can be reliably filled into the recessed part 72 due to its own weight and the filling body 75 can be installed. Accordingly, it is possible to manufacture the rotor 70 for kneading in which it is not necessary to carry out complicated manufacturing steps and the cooling efficiency is improved while suppressing costs.

Next, a third example of the method for manufacturing the rotor for kneading related to the invention will be described.

Figure 9:
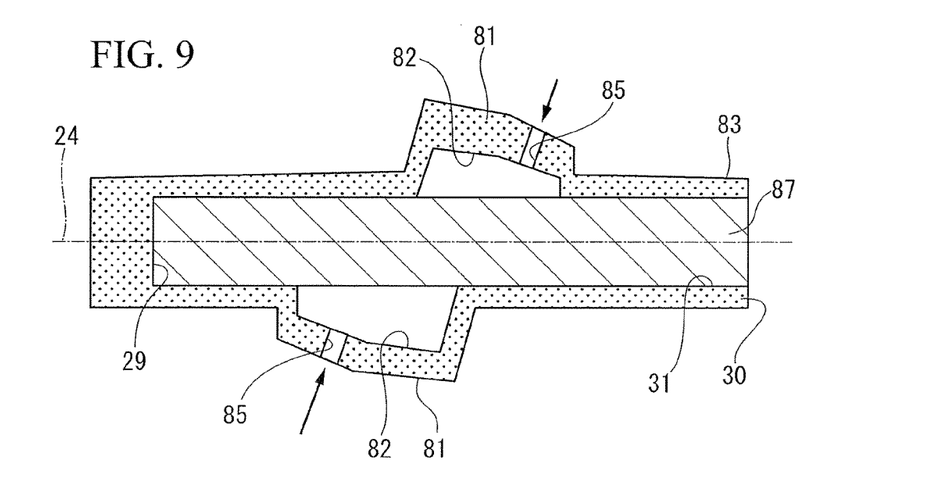
FIG. 9 is a longitudinal cross-sectional view of a first step in a third example of the method for manufacturing the rotor for kneading related to the invention.

In addition, a rotor 80 for kneading has substantially the same configuration as the rotor 50 for kneading of the second embodiment.

As shown in FIG. 9, in a first step (rotor shaft manufacturing step) in the third example of the method for manufacturing the rotor 80 for kneading, the rotor shaft 83 that is a tubular member is manufactured by casting or the like. The rotor shaft 83 is provided with a blade part 81 that overhangs toward an external surface of the rotor shaft 83. A recessed part 82 is formed on a back side of the blade part 81 in an inner surface of the rotor shaft 83.

At this time, filling holes 85 for filling a filling body 84 are simultaneously formed in portions of the blade part 81, and a column-shaped core 87 is accommodated inside the pipe accommodating part 31. The filling holes 85 communicate with the inside of the recessed part 82 from the outside of the blade part 81.

Figure 10:
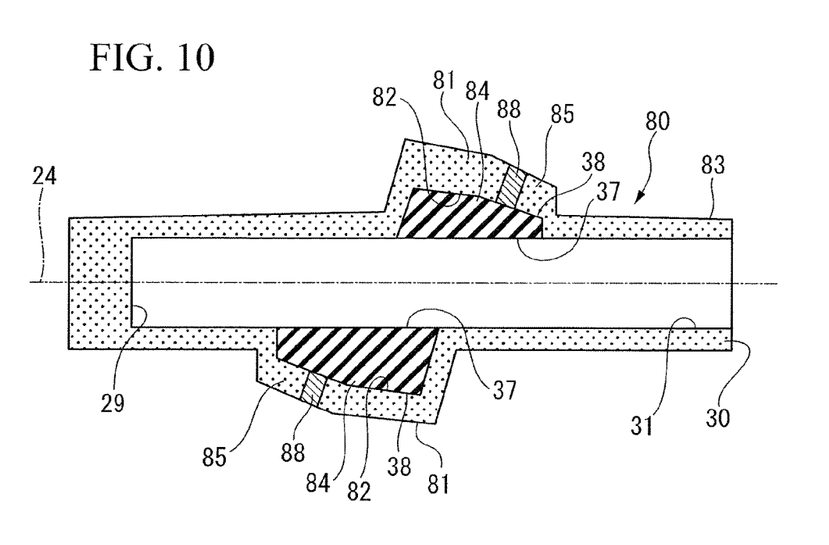
FIG. 10 is a longitudinal cross-sectional view of a second step in the third example of the method for manufacturing the rotor for kneading shown in FIG. 9.

Next, as shown in FIG. 10, in a second step (filling step), a filling material made from a material having a higher thermal conductivity than a material from which the blade part 81 and the rotor shaft 83 are made is poured into the recessed part 82 from the filling holes 85.

At this time, after one filling hole 85 is arranged upward, the filling material is poured into the recessed part 82 on one side, which is arranged upward, from the one filling hole 85, the one filling hole 85 is welded by one plug material 88 and the one filling hole 85 is blocked.

Next, after the other filling hole 85 is arranged upward and the filling material is poured into the recessed part 82 on the other side, which is arranged upward, from the other filling hole 85, the other filling hole 85 is welded by the other plug material 88, the other filling hole 85 is blocked, and the core 87 is removed.

By virtue of this second step, it is possible to obtain the rotor 80 for kneading in which the filling body 84 made of the high thermal conductivity member having a higher thermal conductivity than the material from which the blade part 81 and the rotor shaft 83 are made is installed inside the recessed part 82 provided in the blade part 81 of the rotor shaft 83.

According to the third example of the method for manufacturing the rotor 80 for kneading, the cavity-like recessed part 82 is formed in advance at a predetermined position, the filling holes 85 are formed in the blade part 81, and the core 87 is accommodated inside the pipe accommodating part 31. Then, the filling body 84 is installed in the recessed part 82 by pouring the filling material from the filling holes 85, and thereafter, the core 87 is removed.

Therefore, according to the third example of the method for manufacturing the rotor for kneading, the filling body 84 can be installed by reliably filling the filling material into the recessed part 82 due to its own weight of the filling material. For this reason, it is possible to manufacture the rotor 80 for kneading in which it is not necessary to carry out a complicated manufacturing step, and the cooling efficiency is improved while suppressing costs.

In addition, the rotor for kneading, the kneading machine, and the method for manufacturing the rotor for kneading in the invention are not limited to the aforementioned respective embodiments, and appropriate modifications, improvements, or the like can be made.

For example, when the rotor 50 for kneading of the second embodiment is manufactured by the manufacturing method of the first example, the third step is executed in a state where the plurality of fins 52 are formed in advance on the filling body 51.

Additionally, when the rotor 50 for kneading of the second embodiment is manufactured by the manufacturing methods of the second example and the third example, an extra filling material is used so as to overflow to an inner peripheral side from the inner surface of the pipe accommodating part 31. Thereafter, the plurality of fins 52 are formed by shaping the filling material by the amount of the overflow by machining or the like.

INDUSTRIAL APPLICABILITY

According to the rotor for kneading, the kneading machine, and the method for manufacturing the rotor for kneading, it is possible to install the filling body in the recessed part of the blade part, thereby to improve the cooling efficiency while suppressing costs.

REFERENCE SIGNS LIST

10, 40: KNEADING MACHINE
20, 21, 50, 60, 70, 80: ROTOR FOR KNEADING
22, 23, 61, 71, 81: BLADE PART
27, 63, 73, 83: ROTOR SHAFT
28, 62, 72, 82: RECESSED PART
36, 51, 65, 75, 84: FILLING BODY
52: FIN

The invention claimed is:
1. A rotor for kneading comprising:
a tubular rotor shaft that has a pipe accommodating part having a first end portion which has a blocking part, a second end portion which is an opening, and an inner surface;
a blade part that is integrally and spirally formed around the tubular rotor shaft and extends outward from the tubular rotor shaft;
an insertion member that is accommodated inside the pipe accommodating part and that includes a cooling medium inlet which is an opening and a tip opening portion which is located in the pipe accommodating part such that a space is provided between the tip opening portion and the blocking part; and
a filling body that is provided in a recessed part which is formed at a position where the blade part is provided on the inner surface of the pipe accommodating part of the tubular rotor shaft, and that is made from a material having a higher thermal conductivity than a material from which the tubular rotor shaft and the blade part are made, wherein the filling body includes a cooling medium contact surface that is configured to come into contact with a cooling medium, and a blade part contact surface that is in contact with the recessed part, wherein the cooling medium contact surface is spirally formed around the tubular rotor shaft, and the cooling medium contact surface extends toward a circumferential direction of the tubular rotor shaft as going toward an end in an axial direction of the tubular rotor shaft, and wherein a cooling surface is formed by the inner surface of the pipe accommodating part and the cooling medium contact surface.

2. The rotor for kneading according to claim 1, further comprising:

fins that are formed on the cooling medium contact surface of the filling body and protrude toward a center axis of the tubular rotor shaft.

\* \* \* \* \*